A. BAILEY.
Drafting Instrument.
No. 1,770.
Patented Sept. 4, 1840.
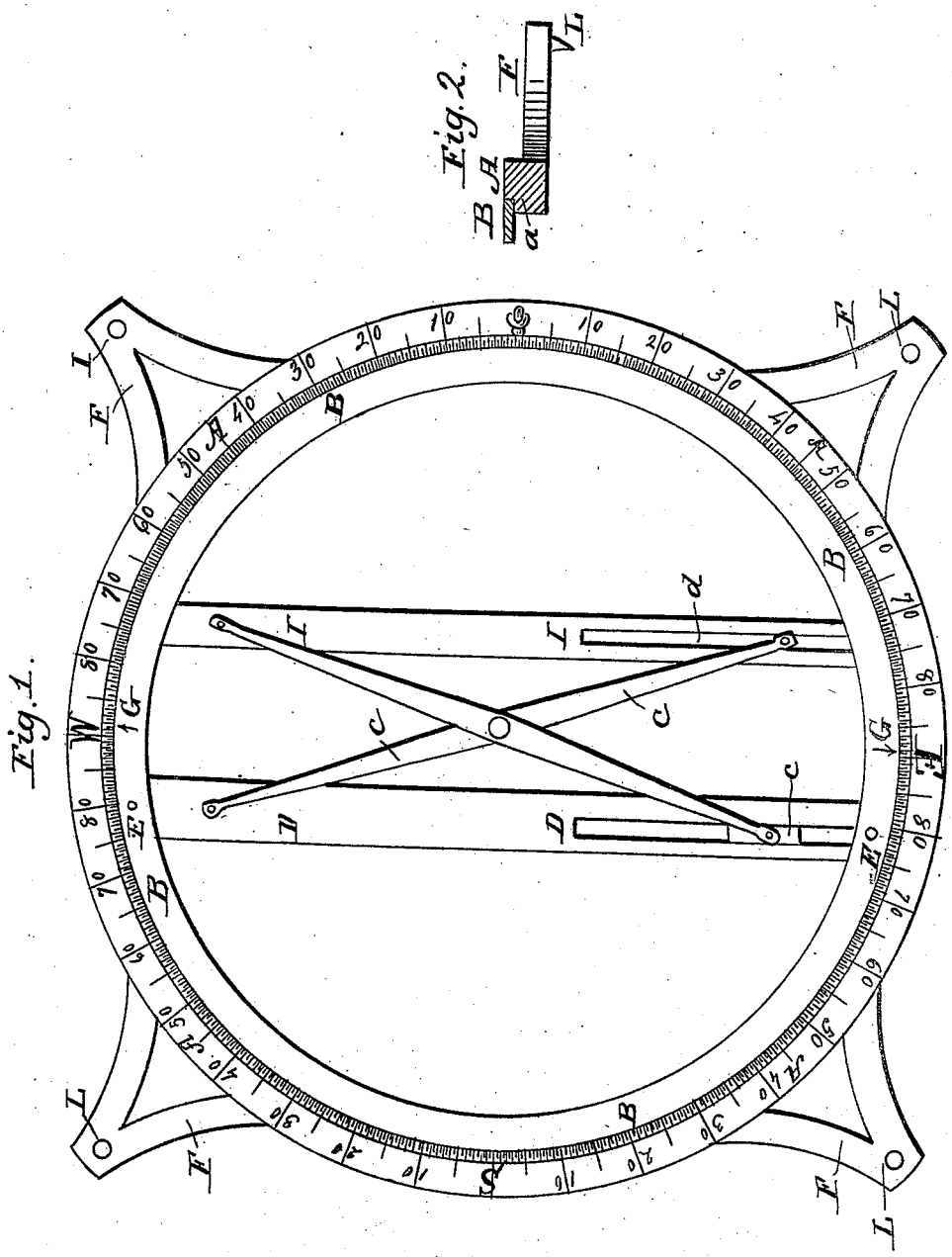

UNITED STATES PATENT OFFICE.

AMITY BAILEY, OF NEWBERRY, SOUTH CAROLINA.

INSTRUMENT FOR DELINEATING MAPS, CHARTS, &c.

Specification of Letters Patent No. 1,770, dated September 4, 1840.

*To all whom it may concern:*

Be it known that I, AMITY BAILEY, of the district of Newberry and State of South Carolina, have invented a new and useful Instrument for Drawing Maps, Charts, Plats of Land, Architectural Plans, and other Rectilinear Geometrical Figures Without the Use of the Protractor or Line of Chords on the Ordinary Scale; and I do hereby declare that the following is a full and exact description of the same chords.

To enable others skilled in the art to make and use the said instrument, I proceed to describe its construction.

The instrument consists of two concentric circular rings, or flat hoops, one called the interior, the other exterior ring; these are set upon feet, about one-fourth of an inch in length, with a small conical pin inserted in each foot, at the bottom and a parallel rule attached to the interior ring, as hereinafter described. The exterior ring (marked in the accompanying drawing A, A, A, A,) is stationary and is divided into degrees and subdivided into parts of degrees, and marked with letters indicating the cardinal points of the compass, with a groove on its inner edge, and has projections on its periphery, (marked in said drawing F, F, F, F,) near the outer end of which are feet (marked L, L, L, L,) about one-fourth an inch in length, in each of which is inserted a conical pin, to secure the paper, or thing, upon which the draft is intended to be made, in its place. The interior ring-shaped plate B, B, B, B, revolves within the exterior one in the groove above mentioned.

Figure 2, is a section through the two rings A and B, showing the groove *a*, in the former.

F, is the projecting piece, with one of the conical points, or feet L, upon which the instrument rests. A parallel ruler D, D, J, J, is attached to the interior ring-shaped plate, by screws, as represented at E, E; the limb D, D, being so attached, while that marked J, J, is free to move on the joints and slides *c, c*. There are two index points, marked G, G, on opposite slides of the interior-ring-shaped plate, one at each end of, and above the outer edge, of the extending limb of the parallel rules J, J, when in contact with the other limb D, D. The circular ring is marked in the usual manner. The parallel ruler may also be made in the usual manner. In the kind I employ, however, each of the limbs has a slot *d d* in it at one end through which one end of the connecting piece *c c* slides so as to admit the ruler being drawn out square and without the ends diverging from each other. The circular rings are turned on a lathe, for that purpose, and the degrees laid off by dividers, or other dividing instruments. The manner of using the said instrument invented by me, is to lay the paper, or other thing, on which the draft is intended to be made, upon a flat surface; then place the instrument upon it, press the conical pins attached to the feet, through the paper, or other thing to be drawn on so as to secure it in its position; move the interior circular ring-shaped plate, until the indices point to the course intended to be delineated; then extend the extending limb of the parallel ruler, to the point from which line is intended to be drawn, and draw said line by that limb of the ruler the distance intended. All which will more fully appear by reference to the accompanying drawing.

What I claim as my invention is—

The combination of the parallel ruler with the revolving ring and graduated circle containing degrees, and parts of degrees, marked thereon, as herein set forth, for the purpose of drawing maps, charts, plats of land, architectural plans, and other rectilinear geometrical figures.

AMITY BAILEY.

Witnesses:
WILLIAM O'CONNOR,
AARON C. BROOKS.